United States Patent
Ishikawa

[11] Patent Number: 5,879,593
[45] Date of Patent: Mar. 9, 1999

[54] FIRE RESISTANT LIQUID, PROCESS FOR PREPARING IT, AND FIREPROOF BUILDING MATERIAL AND FIRE RESISTANT ADHESIVE USING THE FIRE RESISTANT LIQUID

[75] Inventor: Kazuo Ishikawa, Yokohama, Japan

[73] Assignee: Kyoei Corporation, Japan

[21] Appl. No.: 834,208

[22] Filed: Apr. 15, 1997

[30] Foreign Application Priority Data

| Apr. 15, 1996 | [JP] | Japan | 8-092422 |
| Apr. 15, 1996 | [JP] | Japan | 8-092425 |
| Mar. 4, 1997 | [JP] | Japan | 9-049374 |

[51] Int. Cl.⁶ ............... C09K 21/02; C09D 5/18
[52] U.S. Cl. ............ 252/607; 252/608; 252/601; 106/18.12; 423/345; 423/332
[58] Field of Search ........... 252/607, 608, 252/610, 6, 6.5, 7, 8.05, 2, 601; 106/18.12; 423/345, 347, 332, 348

[56] References Cited

U.S. PATENT DOCUMENTS

| 4,447,632 | 5/1984 | Mallon | 556/470 |
| 5,049,316 | 9/1991 | Kokuta et al. | 252/602 |
| 5,164,138 | 11/1992 | Dietl et al. | 264/62 |
| 5,234,631 | 8/1993 | Kokuta et al. | 252/602 |
| 5,308,553 | 5/1994 | Cisneros | 252/601 |
| 5,368,950 | 11/1994 | Kokuta et al. | 428/704 |

*Primary Examiner*—Joseph D. Anthony
*Attorney, Agent, or Firm*—Wenderoth, Lind & Ponack, L.L.P.

[57] ABSTRACT

A fire resistant liquid and a process for the preparation thereof characterized in reacting granulated potassium hydroxide, powdered sodium carbonate, lumps of metallic silicon and water.

A fireproof building material molded by applying a viscous liquid of the fire resistant liquid mixed with bentonite and fibers on one side or both sides of wood-, paper-, metal- and composite boards, and a fireproof building material molded by laminating an incombustible cotton plate to a base plate through a compounding mixture of the fire resistant liquid with bentonite and Chinese cotton. A fire resistant adhesive prepared by mixing the fire resistant liquid with bentonite, Chinese cotton and BENGEL 31.

2 Claims, 1 Drawing Sheet

FIRE RESISTANT LIQUID, PROCESS FOR PREPARING IT, AND FIREPROOF BUILDING MATERIAL AND FIRE RESISTANT ADHESIVE USING THE FIRE RESISTANT LIQUID

FIELD OF THE INVENTION

This invention relates to an inorganic reactive product that is fire resistant liquid, process for preparing, and use for fireproof building material and fire resistant adhesive thereof, with object of providing a building material with excellent fireproofing as well as noise insulating properties and heat insulating properties and an adhesive with excellent fire resisting property.

PRIOR ART

It is known from U.S. Pat. Nos. 5,049,316; 5,234,631 and 5,368,950 that fire resistant composites have been prepared by reacting inorganic materials. Furthermore, it is well-known that tile, asbestos and rock wool have been used for the interior or exterior fitting materials because of their excellent fire resisting properties; foamed synthetic resins, fiber board, asbestos and rock wool are for the noise insulating materials and water glass is for the fire resistant adhesive.

These foregoing fire resistant composites comprise a variety of materials used for preparing it and may evolve harmful gas for preparing.

Also, some problems are known that the fire resisting properties are not always compatible with the noise insulating properties. As for asbestos and rock wool, although they are compatible with both properties, their use is limited by the adverse effect of dust on health. Furthermore, fire resistant adhesives used for molding the laminated building materials have not been found as yet.

Because of not only the extremely poor fire resisting property but also the harmful gas evolution at combustion, some synthetic resins used for various interior and exterior fitting articles are not appropriate for the building materials.

On the other hand, although concrete, reinforced steel and steel frame are widely used for the building structural units, an abrupt decrease in their strength at fire incident is problematic. Conventional adhesives in many kinds or sealant such as bond are also problematic because of their poor fire resisting properties.

SUMMARY OF THE INVENTION

This invention solved the above described problems by providing a water-soluble fire resistant liquid prepared by reacting potassium hydroxide, sodium carbonate, metallic silicon and water.

Thus, the fire resistant liquid of this invention is produced by reacting potassium hydroxide, sodium carbonate, metallic silicon and water.

In this process, potassium hydroxide is used in a granular state, sodium carbonate is used in a powdery state, whereas metallic silicon is used in a lumpy state. A granulated potassium hydroxide is put into a reaction vessel, and then a powdered sodium carbonate is put into the reaction vessel upon the granulated potassium hydroxide. A lumps of metallic silicon is put into the reaction vessel upon the powdered sodium carbonate. Finally, water is put into the reaction vessel. A reaction process producing the fire resistant liquid of this invention comes of itself in the reaction vessel after the water is put into it. It takes two (2) hours to ten (10) hours for this reaction process producing the fire resistant liquid after the all of starting materials are put into the reaction vessel.

When an amount of starting materials such as granulated potassium hydroxide is a small, reaction process is completed in a short time. Whereas, when an amount of starting materials is a large, it takes a long time for completing a reaction process producing the fire resistant liquid of this invention. The reaction process producing the fire resistant liquid of this invention may be shortened by using a hot water, which has been warned between 40° C. to 50° C.

Here, as for the foregoing sodium carbonate, anhydrous sodium carbonate (so-called "soda ash") is preferred.

As the before described, the fire resistant liquid of this invention is produced by reacting granulated potassium hydroxide, powdered sodium carbonate, lumps of metallic silicon and water for two (2) hours to ten (10) hours. In this reaction process, reaction temperature may rise to 60° C. to 90° C. All of these granulated potassium hydroxide, powdered sodium carbonate and lumps of metallic silicon are put on the market.

Since the prepared fire resistant liquid is water-soluble, its concentration can be controlled by adjusting the volume of water to be supplied for the reaction. For example, in case for forming a fireproofing layer using the fire resistant liquid alone, the amount (weight) of water supplied for the reaction is preferably to be about four (4) times as much as the whole weight of granulated potassium hydroxide and powdered sodium carbonate in order to increase the concentration of the fire resistant liquid. The concentration of the fire resistant liquid may be increased by decreasing the amount (weight) of water to be supplied. For example, high concentrated fire resistant liquid may be produced by using about 2.5 times amount (weight) of water as much as the whole weight of granulated potassium hydroxide and powdered sodium carbonate. But, if the amount (weight) of water to be used is less than 2.5 times as much as the whole weight of granulated potassium hydroxide and powdered sodium carbonate, the reaction process producing the fire resistant liquid can not be carried out smoothly. So that, it is preferable that the amount (weight) of water to be used is at least 2.5 times as much as the whole weight of granulated potassium hydroxide and powdered sodium carbonate.

On the other hand, in case for applying or spraying the fire resistant liquid alone, the amount (weight) of water supplied for the reaction is preferably to be about 4.4 times as much as the whole weight of granulated potassium hydroxide and powdered sodium carbonate in order to decrease the concentration of the fire resistant liquid. The concentration of the fire resistant liquid may be decreased by increasing the amount (weight) of water to be supplied. For example, when the fire resistant liquid is used by mixing with the coating material such as paint, the fire resistant liquid having relatively low concentration may be produced by using about 4.7 times amount (weight) of water as much as the whole weight of granulated potassium hydroxide and powdered sodium carbonate. But, if the amount (weight) of water to be used is more than 4.7 times as much as the whole weight of granulated potassium hydroxide and powdered sodium carbonate, the fire resisting property may be deteriorated. So that, it is preferable that the amount (weight) of water to be used is less than 4.7 time as much as the whole weight of granulated potassium hydroxide and powdered sodium carbonate.

By adding coke (about 10 weight %) to the foregoing fire resistant liquid then applying and drying, a glossy film is formed. By adding casein (1–10 weight %) to the foregoing fire resistant liquid, the liquid becomes insoluble in water. Also, by adding about 10 weight % of coke and about 10 weight % of fluorine together, the fire resistant liquid becomes insoluble in water.

In the other aspect, this invention proposes a fireproofing building material characterized in that the preparation is done by pressure molding a mixture of the foregoing fire resistant liquid and vegetable particles, and another fireproofing building material characterized in that the preparation is done by laminate molding a viscous liquid mixture comprising the foregoing resistant liquid, bentonite and fiber on one side or both sides of the wood-, paper-, metal- and synthetic boards. For example, if veneer is produced by using the fire resistant liquid of this invention, harmless veneer may be produced without using formalin which has been used for producing prior veneer.

By applying the above-mentioned fire resistant liquid prepared according to this invention on one side or both sides of the wood-, synthetic wood-, composite-, paper such as pressure molded paper- or metal board, a fireproof building material can be prepared. For example, the fire resistant liquid of this invention was applied with 1 mm to 3 mm thickness on the surface of 5 mm to 10 mm-thick wood board and dried for 2–10 hrs., then the coated board was heated by the flame of a gas burner at 1000° C., its incombustibility was recognized for 1–3 minutes. As the control test, a barefaced wood board (without coating of the fire resistant liquid) with the same quality (5 mm to 10 mm thick) was heated by the flame of a gas burner at 1000° C., but it burned out in 2–5 seconds.

This invention further proposes a building material with excellent fireproofing, noise insulating and heat insulating properties produced by using the fire resistant liquid of this invention, and still further proposes an adhesive with excellent fire resisting property produced by using the fire resistant liquid of this invention.

Namely, a building material with excellent fireproofing, noise insulating and heat insulating properties can be provided by preparing a compound comprising the fire resistant liquid of this invention mixed with bentonite and Chinese cotton, and bonding an incombustible cotton plate (such as blanket) with the base plate using the said compound. In this case, paper-, wood-, glass-, metal- or concrete board can be used as the base plate, and stainless steel- or ceramic cotton can be used as the incombustible cotton plate.

That is to say, anyone of combustible material board such as paper-, wood-, synthetic-, or glass-board as well as anyone of incombustible material board such as concrete-, metal-, or ceramic molded board may be used as the base plate. And, metal cotton, rock cotton, asbestos, or glass cotton may be used as the incombustible cotton plate. Other than the before described cotton plate, anyone of incombustible cotton comprised by fibers which can not be burn out but maintain its form or shape at a high temperature of fire may be used as the incombustible cotton plate.

A mixture comprising and stirring the fire resistant liquid of this invention, bentonite, Chinese cotton and BENGEL 31 is used as an adhesive having a superior fire resistant property. In this case, the preferable ratio in weight of ingredients for preparing an excellent fire resistant adhesive by mixing and stirring the before described ingredients is fire resistant liquid: bentonite: Chinese cotton: BENGEL 31=100: 50 to 70: 0.5 to 1.5: 1 to 2.5.

Furthermore, the preferable ratio in weight of the ingredients for preparing another excellent fire resistant adhesive by using the foregoing fire resistant liquid is fire resistant liquid: bentonite: Chinese cotton: BENGEL 31: graphite: carbon fiber=100: 50 to 70: 0.5 to 1.5: 1 to 2.5: 0.1 to 0.3: 0.05 to 0.1. By mixing and stirring the before described ingredients, the another excellent fire resistant adhesive may be produced.

Such adhesives produced according to this invention as the before described enable the sawdust, chaff, cork pieces, paper pieces and reclaimed synthetic resin powder to mold their own boards. These boards, such as the sawdust-mold board is excellent in noise insulation as well as incombustibility.

Provided these foregoing fire resistant adhesives are used for as adhesives for producing a veneer, a harmless veneer can be produced not using formalin.

By utilizing these foregoing fire resistant adhesives for molding paper-, fiber- and sawdust boards, using paper pieces, fibers or sawdusts which have an excellent noise insulation, the building materials with excellent noise insulation as well as fireproofing properties are provided.

The foregoing fire resistant adhesives of this invention can be used not only for building materials as the fire resistant liquid may be used but also for strongly bonding the building materials, no matter whether combustible or incombustible ones they are, as well as various other kinds of materials.

The fire resistant adhesive of this invention, wherein graphite and carbon fiber are mixed in place of Chinese cotton and BENGEL 31, can be used for fire resistant putty or joint sealant. This joint sealant has an advantage of no cracking and shrinking, retarding the flame spread on fire.

Applying the fire resistant liquid of this invention on one side or both sides of the combustible material such as wood- or paper board, not only the flame retarding but also incombustible properties are supplied for the material.

Since the fire resistant liquid of this invention is mass produced by a simple manufacturing process and the raw materials are readily supplied at low prices, its manufacturing cost can be estimated conservatively. A glossy film may be formed by adding some treatment.

The fire resistant liquid of the present invention is water-soluble, so that concentration of the liquid prepared by the reaction can be controlled. A glossy film may be formed by adding some treatment. And, even if the fire resistant liquid is heated, no toxic gas is evolved.

By applying and drying the foregoing fire resistant liquid alone or some kinds of paint containing the foregoing fire resistant liquid with specific thickness on a base plate, its combustible property varies to incombustible property. By further laminating a fire resistant material such as metallic cotton, much more excellent fireproofing and noise insulating properties are provided.

Such the building material prepared according to this invention has no trend of toxic gas evolution even at high temperatures on heating, and exhibits good moldability (free saw-cutting). The fire resistant adhesive prepared by using the fire resistant liquid of this invention has such the excellent bonding properties with various building materials that it is available for putty or sealant.

DESCRIPTION OF THE PREFERRED EMBODIMENT

EXAMPLE 1

Figure 1:
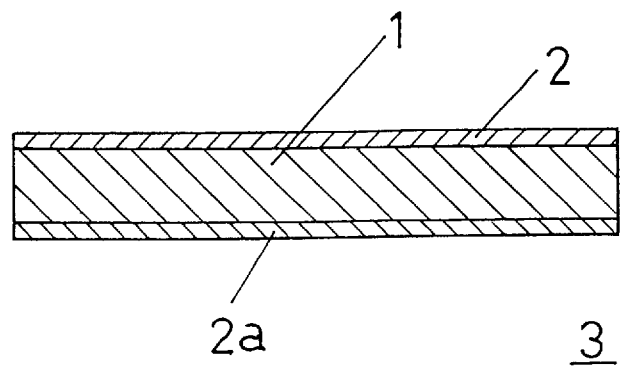
FIG. 1 illustrates a partial sectional view of a fireproof building material of this invention.

After putting 8 kg of granulated potassium hydroxide into a reaction vessel, 7 kg of powdered sodium carbonate (soda ash) (commercial product manufactured by ASAHI Glass Co., Ltd.), and 30 kg of lumps of metallic silicon are put into the reaction vessel one another after. And then, 60 liters of water is put into the reaction vessel.

A reaction process comes in itself in the reaction vessel. At the first, a violent reaction begins from the layer of granulated potassium hydroxide, which exists at the bottom of the reaction vessel, and then a convection from lower part upto the upper part is found in the reaction vessel. Reaction temperature rises along with the progress of reaction procedure in the vessel. The most active reaction is caused when reaction temperature is between 80° C. to 90° C. In this example, reaction temperature does not rise above 92° C.

About 10 hours after the water is put into the reaction vessel, the reaction process is completed. About 48 liters of the fire resistant liquid having a weight at about 70 kg is produced by isolating solid phase.

The isolated solid phase is a reminder of the initially lumps of metal silicon. About 22 kg of lumps of metal silicon is remained by washing said isolated solid phase. So that, the said remained lumps of metal silicon can be used for the next reaction process by adding about 8 kg of lumps of metal silicon totalled upto 30 kg.

That is to say, as same as the first reaction process, 8 kg of granulated potassium hydroxide, 7 kg of powdered sodium carbonate (soda ash), the remained lumps of metal silicon (about 22 kg) and 8 kg of lumps of metal silicon are put into the reaction vessel. And then, 60 liters of water is put into the vessel. The second reaction process comes in itself in the reaction vessel.

In this example, it is preferable for producing the fire resistant liquid to put granulated potassium hydroxide into the reaction vessel firstly, then powdered sodium carbonate is put into the vessel over the layer of granulated potassium hydroxide, and lumps of metal silicon is put into the vessel over the layer of powdered sodium carbonate one after another, and finally water is put into the vessel, since the layer of granulated potassium, which exists at the bottom of the vessel, begins reaction at the first so that violent convention from lower part upto the upper part is caused in the vessel.

The fire resistant liquid produced by the before described reaction process has a relatively high concentration. By applying this fire resistant liquid on a combustible plate such as wood board plate, a fire resistant material covered with the fireproof layer is obtained. This fire resistant material was incombustible for 30 minutes while heating (1000° C.) with the flame of a gas burner in close proximity.

The before described example may be altered, provided that the amount (weight) of granulated potassium hydroxide, powdered sodium carbonate and lumps of metallic silicon are remain as same as the before described, to increase the amount of water to be used upto 70 liters. In the case 70 liters of water is used, provided that the amount (weight) of the other compositions remains as the before described, the produced fire resistant liquid has a relatively low concentration. This fire resistant liquid having a relatively low concentration may be used as follows. By mixing 70 weight % of the fire resistant liquid with 20 weight % of a commercial paint product and 10 weight % of Chinese cotton, a fire resistant paint to be applied for the interior fittings is prepared. Then, by applying 3 to 5 times (2 to 3 mm thick) this fire resistant paint on the interior fittings of building, the fireproof walls may be formed, even though the substrate consisted of combustible materials.

If the amount (weight) of water to be supplied is increased, the amount (weight) of metallic silicon remained after the reaction process is increased correspondingly. If 70 liters of water is used, provided that the amount (weight) of the other compositions remains as the before described, about 25 kg of metallic silicon is remained after the completion of reaction process.

EXAMPLE 2

After putting 3 kg of granulated potassium hydroxide into the reaction vessel, 2 kg of powdered sodium carbonate (soda ash), 15 kg of lumps of metallic silicon and 20 kg of water are put into the reaction vessel one after another. After the putting of water, reaction begins of itself. A reaction temperature rises 80° C. to 90° C. Reaction process is completed about 2 to 5 hours. And about 22.0 kg to 26.0 kg of the fire resistant liquid having a weight at about 7 kg is produced.

Since the metallic silicon used for the foregoing reaction was not consumed totally and some of it still remains after its reaction has completed. The remained metallic silicon may be used for the next reaction process for producing the fire resistant liquid by washing it and adding some lumps of metallic silicon totalled upto 15 kg.

The prepared fire resistant liquid is an aqueous solution of pH 10–12.

By mixing 70 weight % of the fire resistant liquid produced as the before described, 20 weight % of a commercial paint product, and 10 weight % of Chinese cotton, a fire resistant paint applied for the interior fittings is prepared. In this case, it may be altered that the fire resistant paint is prepared without using Chinese cotton. But, by adding and mixing Chinese cotton, fire resistant properties of the fire resistant paint may be increased.

By applying 3–5 times (2–3 mm thick) the before described fire resistant paint on the interior fittings of building, the fireproof walls could be formed, even though the substrate consisted of combustible materials.

If lower amount of water was supplied for the reaction, an increased viscosity of the fire resistant liquid appeared. On the other hand, higher amount of water diluted the prepared fire resistant liquid to be convenient for the application.

In this example, if the amount of water is increased to 24 kg, provided that the amount (weight) of granulated potassium hydroxide, powdered sodium carbonate and lumps of metallic silicon is remained, the fire resistant liquid which has an appropriate concentration for mixing with the painting material is produced.

EXAMPLE 3

After putting 4 kg of granulated potassium hydroxide into the reaction vessel, 3 kg of powdered sodium carbonate (soda ash), 8 kg of lumps of metallic silicon and 32 liters of water are put into the reaction vessel one another after. After the putting of water, reaction begins of itself. A reaction temperature rises at about 60° C. to 90° C. Reaction process is completed about 4 hours. And about 32 kg of the fire resistant liquid having a volume of about 18 to 25 liters is produced by isolating a remaining solid phase.

The isolated solid phase is a remainder of the initially lumps of metallic silicon, and it can be used for the next reaction producing the fire resistant liquid by washing the said remainder and adding some lumps of metallic silicon totalled upto 8 kg.

After adding 4 liters of water to the fire resistant liquid prepared in this Example and stirring uniformly, they were applied on a base plate to produce a fire resistant material covered with the fireproof layer.

EXAMPLE 4

After pouring 50 weight % of the fire resistant liquid shown in Example 2 into 50 weight % of sawdust or chaff alone or their mixture and stirring uniformly, they were pressure molded by hot press at 180° C. to 200° C. to obtain a 10 mm-thick fireproof board. This fireproof board was incombustible for 30 minutes while heating (1000° C.) with the flame of a gas burner in close proximity. In case of the fireproof board comprising a chaff mixture or alone, nitrification of the surface was recognized.

EXAMPLE 5

A viscous liquid, prepared by mixing 40 weight % of the fire resistant liquid in Example 2 with 45 weight % of bentonite and 15 weight % of Chinese cotton and stirring uniformly, was applied with a 2.5-mm layer on the surface of a 10 mm-thick wood board.

After air drying, it yielded a fireproof board incombustible for 5 minutes while heating (1000° C.) with the flame of a gas burner in close proximity.

EXAMPLE 6

After mixing the fire resistant liquid of this invention prepared in Example 2 with a paint, it was applied with 2–3 mm layers 2, 2a on both sides of a 10 mm-thick wood board 1 to yield a fireproof building material 3. (FIG. 1)

While heating (1000° C.) with the flame of a gas burner in close proximity, the fireproof building material 3 was incombustible for 3 minutes. In the control test, a 10 mm-thick wood board without the foregoing coating layer was heated (1000° C.) by the flame of a gas burner but it burned out in 3 seconds.

EXAMPLE 7

Mixing and stirring 60 weight % of the fire resistant liquid of this invention prepared in Example 2 with 1.0 weight % of Chinese cotton, 30 weight % of bentonite and 9 weight % of BENGEL 31, a fire resistant adhesive was produced.

Figure 2:
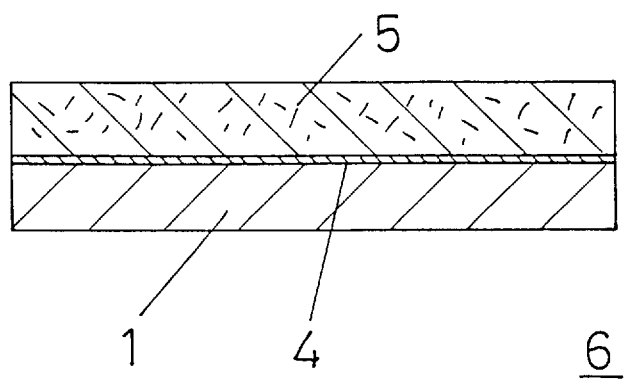
FIG. 2 illustrates a partial sectional view of another fireproof building material of this invention.

After applying this fire resistant adhesive with a 2.5 mm-thick fireproof layer 4 on the surface of a 10 mm-thick wood board 1, a 10 mm-thick metal cotton plate (blanket) 5 (Manufactured by Shin-Nittetsu Co., Ltd. or Isoright Co., Ltd.) was laminated overlapping thereon to form a fireproof building material 6 of this invention. (FIG. 2)

While heating (1000° C.) this fireproof building material 6 with the spraying flame of a gas burner in close proximity, the metal cotton was ignited in 2 minutes but the wood board was still incombustible after 30 minutes elapsed.

EXAMPLE 8

Adding 2.5 kg of bentonite, 40 g of Chinese cotton and 80 g of BENGEL 31 (thickener) to 4 liters of the fire resistant liquid of this invention prepared in Example 2, they were stirred uniformly to produce 8 to 10 kg of a fire resistant adhesive of this invention.

EXAMPLE 9

Adding 2.5 kg of bentonite, 40 g of Chinese cotton, 80 g of BENGEL 31, 4 g of graphite and 2 g of carbon fiber to 4 liters of the fire resistant liquid of this invention prepared in Example 2, they were stirred uniformly to produce 8 kg to 8.5 kg of a fire resistant sealant of this invention.

Although the present invention has been described with reference to the particular preferred embodiments, it should be understood that various changes and modifications may be made within the spirit and scope of the invention as defined in the appended claims.

What is claimed is:

1. A fire resistant liquid prepared by reacting essentially granulated potassium hydroxide, powdered sodium carbonate (soda ash), lump metallic silicon and water; wherein the resultant fire resistant liquid is water soluble.

2. A process for producing a fire resistant liquid comprising the steps of placing essentially granulated potassium hydroxide into a reaction vessel, followed by placing powdered sodium carbonate into the reaction vessel upon said potassium hydroxide, followed by placing lump metallic silicon into the reaction vessel upon the powdered sodium carbonate, and finally adding water into the reaction vessel.

* * * * *